United States Patent
Leung

(10) Patent No.: US 11,776,186 B2
(45) Date of Patent: Oct. 3, 2023

(54) METHOD FOR OPTIMIZING THE IMAGE PROCESSING OF WEB VIDEOS, ELECTRONIC DEVICE, AND STORAGE MEDIUM APPLYING THE METHOD

(71) Applicant: HON HAI PRECISION INDUSTRY CO., LTD., New Taipei (TW)

(72) Inventor: Yin-Chung Leung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/747,146

(22) Filed: May 18, 2022

(65) Prior Publication Data
US 2023/0059020 A1 Feb. 23, 2023

(30) Foreign Application Priority Data
Aug. 17, 2021 (CN) .......................... 202110945055.X

(51) Int. Cl.
*G06T 11/60* (2006.01)
*G06V 20/40* (2022.01)
*G06F 40/143* (2020.01)

(52) U.S. Cl.
CPC ............ *G06T 11/60* (2013.01); *G06F 40/143* (2020.01); *G06V 20/46* (2022.01)

(58) Field of Classification Search
CPC ........ G06T 11/60; G06F 40/143; G06V 20/46
See application file for complete search history.

(56) References Cited

U.S. PATENT DOCUMENTS

| | | | |
|---|---|---|---|
| 9,390,506 B1* | 7/2016 | Asvatha Narayanan | G06T 7/194 |
| 11,379,972 B2* | 7/2022 | Peleg | G06N 3/045 |
| 2002/0109112 A1* | 8/2002 | Guha | G06T 7/0004 250/559.46 |
| 2008/0253608 A1* | 10/2008 | Long | G06K 7/14 348/222.1 |
| 2008/0276269 A1* | 11/2008 | Miller | H04N 21/23424 725/34 |
| 2012/0257249 A1 | 10/2012 | Natarajan | |

(Continued)

FOREIGN PATENT DOCUMENTS

CN 105204853 A 12/2015

OTHER PUBLICATIONS

Fisher, James, How to write an ArrayBuffer to a canvas, captured May 12, 2020, retrieved from https://web.archive.org/web/20200512101818/https://jameshfisher.com/2020/03/01/how-to-write-an-arraybuffer-to-a-canvas/ (Year: 2020).*

*Primary Examiner* — Keith D Bloomquist
(74) *Attorney, Agent, or Firm* — ScienBiziP, P.C.

(57) ABSTRACT

In a method for optimizing the image processing of web videos, information of an image frame in a web video is obtained. A canvas element based on the information of the image is created, and a canvas element is drawn based on the information of the image. Attached recognition information is obtained. A block element based on the attached information is created, and the attached information is set into the block element. The canvas element and the block element are composed and stacked on a web page. The canvas element and the block element are displayed in the web page. An electronic device, and a non-transitory computer readable storage medium applying the method are also provided.

15 Claims, 6 Drawing Sheets

(56) References Cited

U.S. PATENT DOCUMENTS

| | | | |
|---|---|---|---|
| 2016/0088341 A1* | 3/2016 | Yabu | H04N 5/265 |
| | | | 725/32 |
| 2018/0211373 A1* | 7/2018 | Stoppa | G06T 7/55 |
| 2018/0225808 A1* | 8/2018 | Chakraborty | G02B 27/0172 |
| 2019/0096135 A1* | 3/2019 | Dal Mutto | G06F 18/24765 |
| 2019/0114781 A1* | 4/2019 | Gao | G06F 16/51 |
| 2020/0005422 A1* | 1/2020 | Subramanian | G06T 7/194 |
| 2020/0349390 A1* | 11/2020 | Konwar | G06F 18/2185 |
| 2021/0201471 A1* | 7/2021 | Sreeram | G06F 18/2411 |
| 2021/0272298 A1* | 9/2021 | Leonard | G06T 3/0068 |
| 2023/0053085 A1* | 2/2023 | Osunkwo | G06F 18/28 |

* cited by examiner

METHOD FOR OPTIMIZING THE IMAGE PROCESSING OF WEB VIDEOS, ELECTRONIC DEVICE, AND STORAGE MEDIUM APPLYING THE METHOD

FIELD

The subject matter herein generally relates to image processing, particularly to web video processing, a method for optimizing the image processing of web videos, an electronic device, and a storage medium applying the method.

BACKGROUND

During the manufacturing of integrated circuit (IC) chips, manufacturers need to collect golden samples of the mass-produced IC chips, and label the IC chips which are found to have defects. A camera system films a first video of the non-inspected IC chips. The first video is then imported into a recognition system. The recognition system can process the first video to export the bounding box of the IC chips with attached information of the corresponding position coordinates. The first video and the attached information are transmitted from a server to a client. The first video and the attached information were combined to form a second video before showing to users. The users can collect the golden samples and label the IC chips with the defects based on the second video and the attached information.

During the transmission of the first video and the attached information from the server to the client, the server compresses the first video and the attached information using a variable bitrate (VBR) technology. The image quality of the compressed video is low, and the clarity of the attached information is also lowered accordingly. The attached information can include detail content, such as texts or lines, so this can affect the user recognition of the second video if the attached information is not clear enough after the compression.

The algorithms in the recognition system for analyzing and processing the first video is complex. Since the processing duration may be slower than the time for a frame to be captured, the processing speed of the recognition system and the output frame rate of the camera system are not the same, and the attached information may not be able to synchronized with the first video. For maintaining the frame rate of the camera system, a determining component is required for determining whether the recognition system is able to output the attached information, which is not synchronized with the first video, under the frame rate of the camera system. Thus, the development cost of the system is increased, and the transmission becomes a complex operation.

Thus, there is room for improvement in the art.

BRIEF DESCRIPTION OF THE DRAWINGS

Implementations of the present disclosure will now be described, by way of example only, with reference to the attached figures.

DETAILED DESCRIPTION

Figure 1:
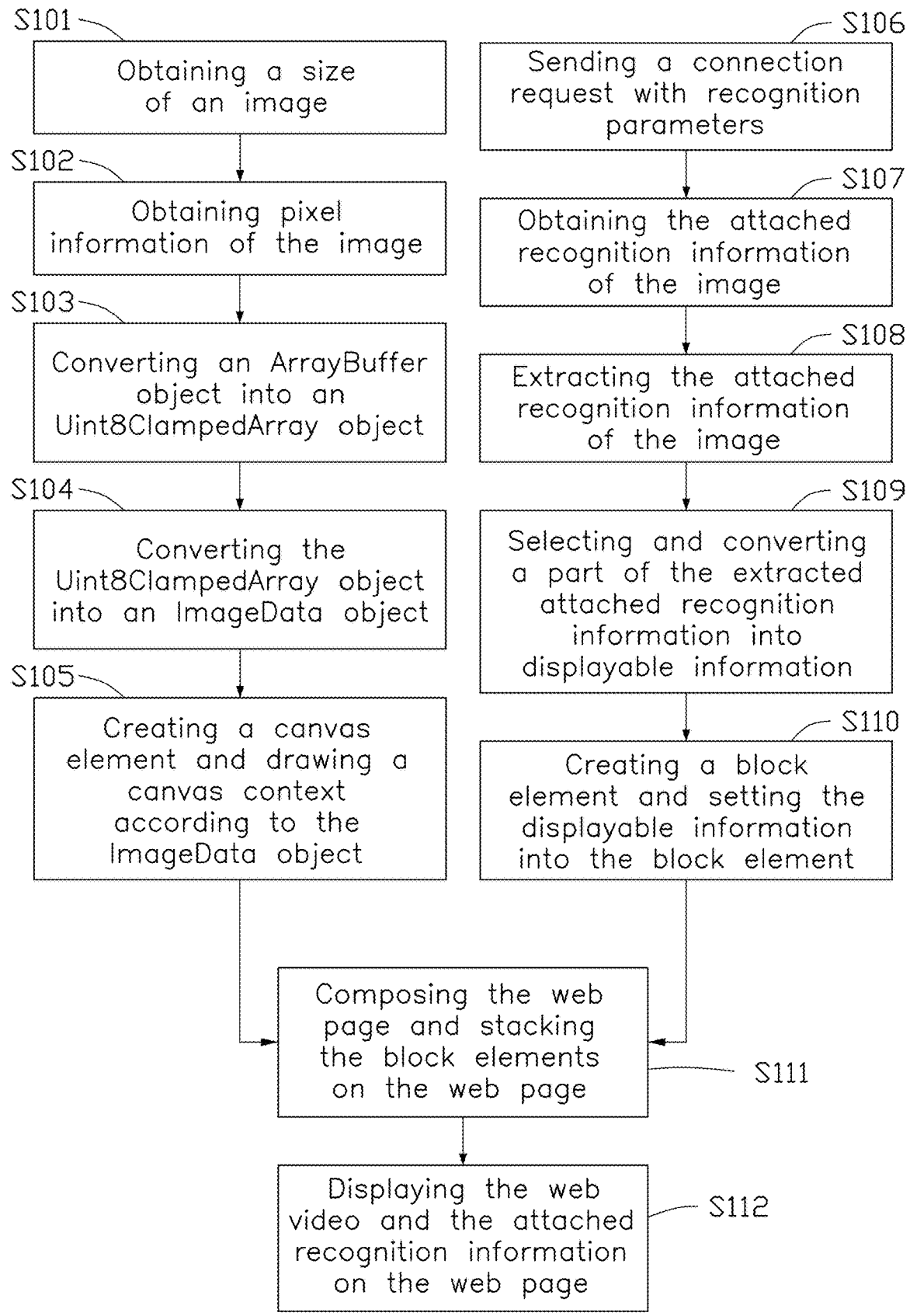
FIG. 1 is a flowchart illustrating an embodiment of method for optimizing the image processing of web videos with recognition information overlays according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

As used in this application, the terms "environment," "system," "engine," "module," "component," "architecture," "interface," "unit," and the like refer to a computer-related entity or an entity related to an operational apparatus with one or more defined functionalities. The terms "environment," "system," "engine," "module," "component," "architecture," "interface," and "unit" can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can be executed from various computer-readable non-transitory storage media having various data structures stored thereon. Modules can communicate via local and/or remote processes in accordance, for example, with a signal (either analog or digital) having one or more data packets (e.g., data from one component interacting with another component in a local system, distributed system, and/or across a network such as a wide area network with other systems via the signal).

Figure 6:
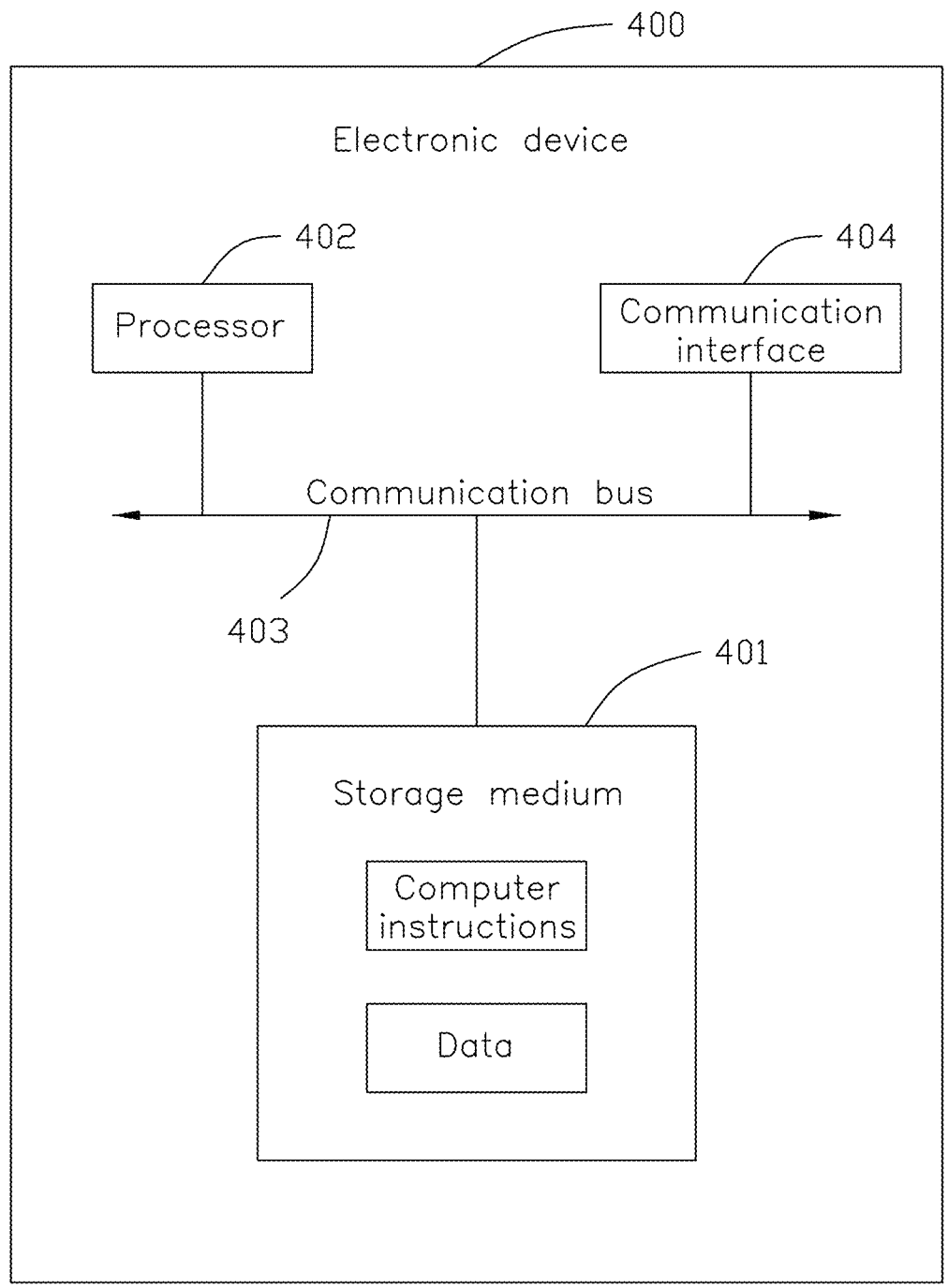
FIG. 6 is a diagram illustrating embodiments of an electronic device according to the present disclosure.

FIG. 1 shows a flowchart of a method for optimizing the image processing of web videos. As shown in FIG. 3, the method is used in the electronic device 400 (as shown in FIG. 6). The electronic device 400 for displaying the web videos can directly embed functions of the method or implement the same using Software Development Kit (SDK) manner of the present disclosure. As shown in FIG. 1, the method includes the following steps. These steps may be re-ordered:

In block S101, a size of an image is obtained.

Figure 5:
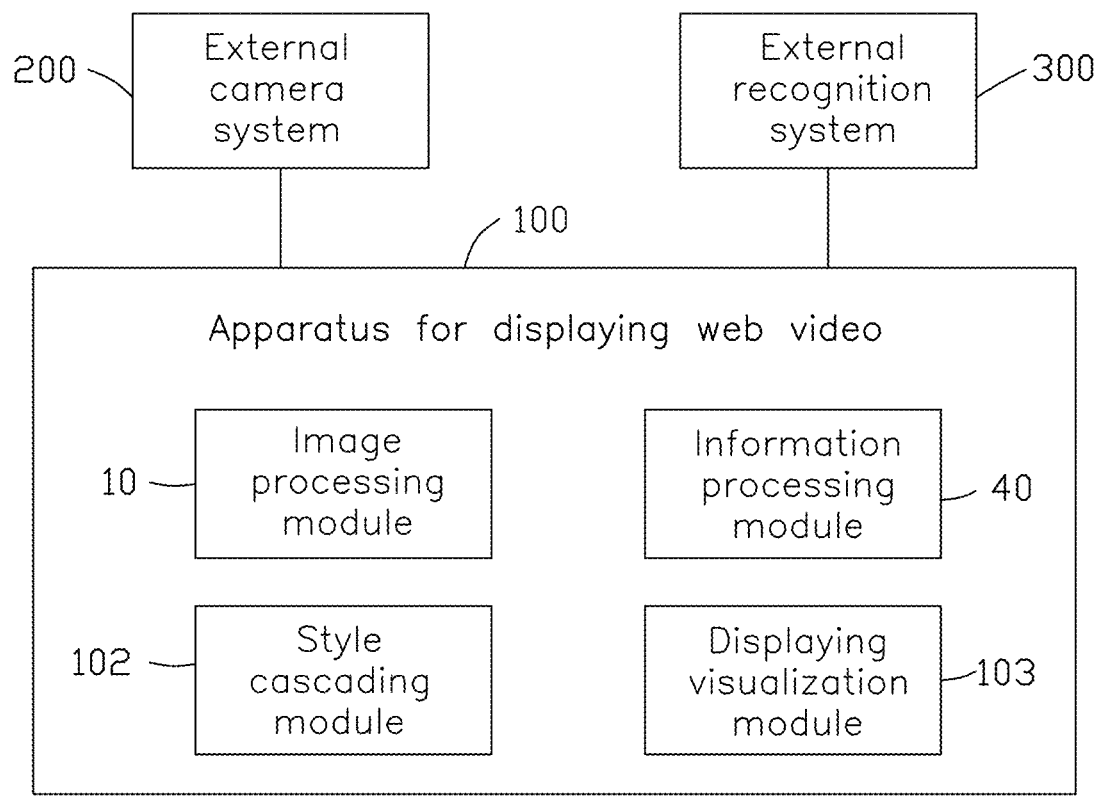
FIG. 5 is a diagram illustrating embodiments of an apparatus for optimizing the image processing of web videos according to the present disclosure.

In one embodiment, the image is a frame of a video filmed by an external camera system 200 (as shown in FIG. 5). The size of the image includes the width and height of the image. The external camera system 200 is configured to film the target objects which need to be sampled or labeled with defects.

In one embodiment, the external camera system 200 can be one or more cameras, and can also be one or more video capturing devices.

In one embodiment, the size of the image can be obtained from the external camera system 200 through an application programming interface (API). The API can be several pre-defined functions to provide applications or developers with an access to independent services running on external software or hardware, without accessing source codes. For example, the size of the image is obtained form the external camera system 200 through the API.

In block S102, pixel information of the image is obtained.

In one embodiment, the external camera system 200 transmits the pixel information to the electronic device 400 through WebSocket. The WebSocket is a protocol in a full-duplex communication over a single transmission control protocol (TCP). The WebSocket allows a server to proactively push data to clients. A persistent connection between the server and the clients can be established, which allows two-way data transmission. The pixel information of the image is a set of RGB values and a transparency value of each pixel in the image, a format of which is an ArrayBuffer object. The ArrayBuffer object is representation for continuous binary data, storing an array of bytes. Directly reading and writing the contents of the ArrayBuffer object are not allowed, but this can be achieved using a TypedArray object or a DataView object. The TypeArray object is an array of typed data, which provides an array-like view of the underlying binary data buffer for reading or writing data in the ArrayBuffer object. DataView object is a low-level interface for reading or writing values in multiple data types in the ArrayBuffer object.

In one embodiment, the electronic device 400 using the method can include one or more controlling buttons (not shown) with specified names can be defined, and can also include one or more monitoring units (not shown). The specified names can be defined by different functions. The controlling buttons control states of the electronic device 400. The monitor monitoring units the states of the electronic device 400.

Preferably, a WebSocket connection with the external camera system 200 is established when a play button of the controlling buttons in the present disclosure is pressed.

Preferably, the WebSocket connection with the external camera system 200 is established when the monitoring unit detects that an auto-play function is turned on.

Preferably, a stream player is paused and the WebSocket connection with the external camera system 200 is closed, when the monitoring unit detects a web page is changed.

Preferably, the stream player is paused and the stream player connection with the external camera system 200 is closed, when the monitoring unit detects no image can be displayed.

In block S103, the ArrayBuffer object is converted into a Uint8ClampedArray object.

In one embodiment, the Uint8ClampedArray object is a type of the TypedArray object, which defines a one dimensional array and stores data in a 8-bit integer object. The ArrayBuffer object is converted into the Uint8ClampedArray object, so reading or writing operations can be executed.

In block S104, the Uint8ClampedArray object is converted into an ImageData object.

In one embodiment, the ImageData object is used to draw images on the web page canvas. The ImageData object includes three parameters: array, width, and height. In one embodiment, image pixel data of the array, the width, and the height are used for drawing context, width, and height of canvas on the web page.

When the Uint8ClampedArray object is converted into the ImageData object, the Uint8ClampedArray object is taken as the array parameter, and the width and height parameter values are obtained by the block S101.

In block S105, a canvas element is created, and a canvas context is drawn according to the ImageData object.

In some embodiment, the method further includes the following steps. These steps may be re-ordered:

In block S106, a connection request with recognition parameters is sent.

In one embodiment, the connection request is a HyperText Transfer Protocol Request (HTTP Request) for establishing a network connection between the electronic device 400 and an external recognition system 300 (as shown in FIG. 5). The external recognition system 300 processes the image obtained in block S101 attach recognition information. The recognition information includes the size and the coordinates of the bounding box of the recognizing object. The recognition parameters are used for informing the external recognition system 300 about the type and the size of the recognizing object to the external recognition system 300.

In block S107, the attached recognition information of the image is obtained.

In one embodiment, the external recognition system 300 sends the attached recognition information of the image using a Server-Sent Events (SSE). SSE enables the external recognition system 300 to push data, and maintains the connection to the electronic device 400. The external recognition system 300 can keep sending the latest data.

The electronic device 400 receives the attached information through SSE. The attached information is in a JavaScript Object Notation (JSON) format. The JSON format is a data storing format, which is language-agnostic and lightweight. Using the JSON format for transmitting the attached information, a resource utilization of the server and the client can be reduced, and an amount of data stored in the server and the client can be decreased.

In one embodiment, the electronic device 400 using the method can include one or more controlling buttons with specified names, and one or more monitoring units. The specified names can be defined by different functions. The controlling buttons control states of the electronic device 400. The monitoring units are configured to monitor the states of the electronic device 400.

Preferably, an SSE connection with the external camera system 200 is established when the play button of the controlling buttons in the present disclosure is pressed.

Preferably, the SSE connection with the external camera system 200 is established when the monitoring unit detects that the auto-play function is turned on.

Preferably, the stream player is paused and the SSE connection with the external camera system 200 is closed when the monitoring unit detects a web page is changed.

Preferably, the stream player is paused and the SSE connection with the external camera system 200 is closed, when the monitoring unit detects no image can be displayed.

In block S108, the attached information of the image is extracted.

In one embodiment, the attached information in JSON format obtained by the electronic device 400 is converted into a JSON object for extracting the data in the attached recognition information, which is then used on the web page.

In one embodiment, a JSON parser is used for extracting the attached information in the JSON format. A native JavaScript function can also be called for extracting the attached information in the JSON format.

In block S109, a part of the extracted attached information being selected is converted into a displayable attached information.

In one embodiment, the part of the extracted attached recognition information is selected and converted into displayable information. The part of the extracted attached recognition information can include the size and the coordinates of the bounding box of the recognition object. The displayable information is used to aid the visualizations on the web page.

In one embodiment, the electronic device 400 using the method can include one or more controlling buttons with specified names. The specified names can be defined by different functions. The controlling buttons are configured to control whether the extracted attached recognition information is converted to displayable information and be displayed on the web page.

Preferably, the attached recognition information with the size and coordinates of the bounding box of the recognition object is converted into and displayed information for visualization on the web page, when a "Show Size" button of the controlling buttons in the present disclosure is pressed.

Preferably, the operation for converting the extracted attached recognition information into the displayable information is disabled, when a "No Overlays" button of the controlling buttons in the present disclosure is pressed.

In block S110, a block element is created and the displayable information is set into the block elements.

In one embodiment, the block element is a div element of the HTML, and is set as a block on the web page. The data is set into the block for visualizations.

In block S111, the web page is composed and the block elements are stacked on the web page.

In one embodiment, Cascading Style Sheets (CSS) are used for composing and stacking the elements of the HTML web page. The layout of elements composition can include, but not limited to, displaying, hiding, rotating, zooming in, and translating the content of the stream playing.

It is understood that the CSS can compose and stack the canvas elements and the block elements. The CSS can define the relative position, the size, and a stacking sequence of the elements of the HTML web page.

Each element of the HTML has a z-index style property, which represents the stacking sequence of the element. The CSS stacks the elements in the order according to the z-index property. The larger the value of the z-index property, the higher the element will be in the stacking sequence. For example, when the canvas element needed to be stacked at the bottom, the z-index property of the canvas element is set as 0 in the CSS, and the z-index property of other elements are et as positive integers.

In one embodiment, the electronic device 400 using the method can include one or more controlling buttons with specified names, stream player wrapper, and error information. The specified names can be defined by different controlling functions. The controlling buttons are configured to control a composing and stacking manner of the elements of the HTML using CSS. The stream player wrapper is an outline wrapper element for containing the stream player displaying the web video. The error information is a received error icon or an error information when an apparatus 100 (as shown in FIG. 5) experiences a connection error.

Preferably, the CSS can compose and stack the controlling buttons, the stream player wrapper, and the error information.

In block S112, the web video and the attached recognition information are displayed.

In one embodiment, the video is the streaming images of the canvas elements, and the attached information is visualized using the block elements.

Figure 2:
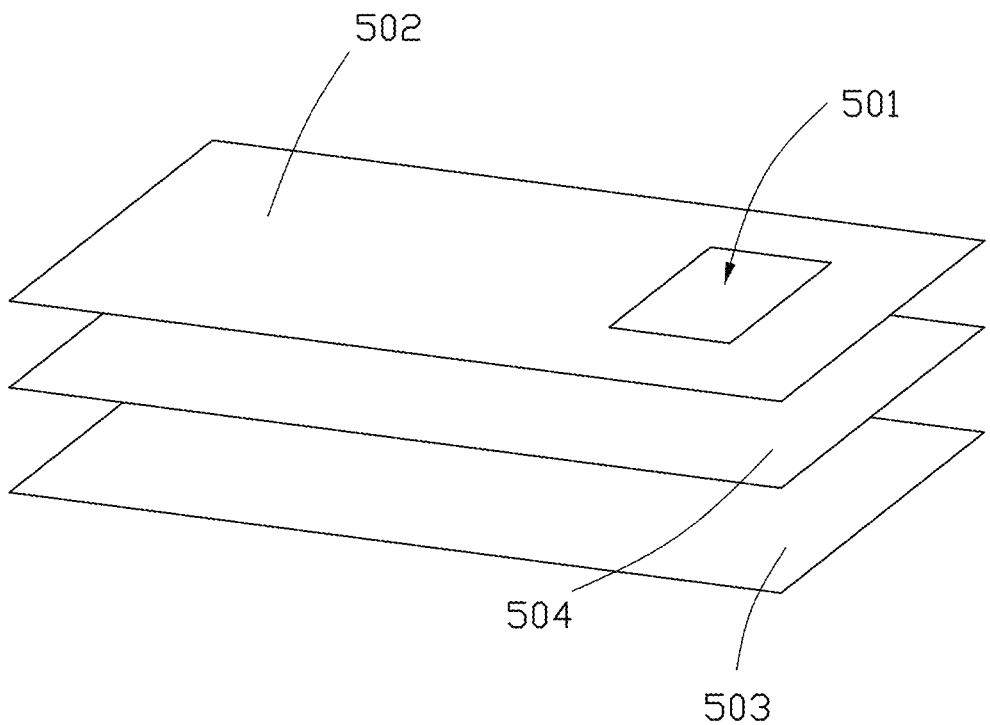
FIG. 2 is a diagram illustrating an embodiment of elements of HTML stacked by CSS according to the present disclosure.

FIG. 2 shows the elements of the HTML web page stacked by the CSS. The elements of the HTML web page include the controlling button 501, the stream player wrapper 502, the canvas element 503, and the block element 504.

When the stack sequence of the elements of the HTML web page is defined by the CSS as the controlling button 501, the stream player wrapper 502, the block element 504, and the canvas element 503, the video taken by the external camera system 200 and the attached information stacked on the video are directly shown to users.

FIGS. 3A-3D show the elements of HTML web page being composed by the CSS in different manners. The elements of the HTML include the stream player wrapper 502, the canvas element 503, and the block element 504.

Figure 3A:
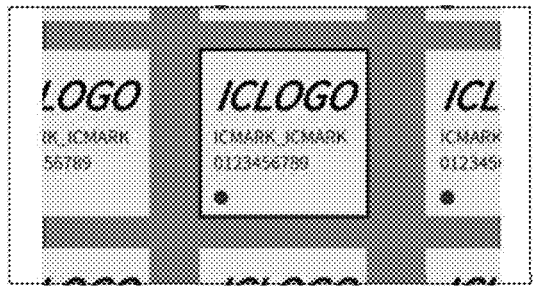
FIGS. 3A-3D are diagrams illustrating embodiments of canvas elements of showing within a stream player in different manners according to the present disclosure.

As shown in FIG. 3A, the canvas element 503 is displayed in a normal state in the stream player wrapper 502.

Figure 3B:
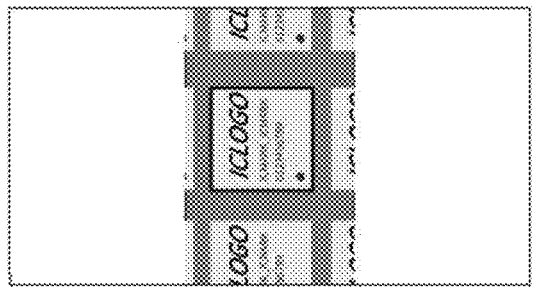

As shown in FIG. 3B, the canvas element 503 and the block element 504 are rotated in the stream player wrapper 502 by the CSS when the controlling button named "Rotate" is pressed. A rotation direction and a rotation angle can be pre-defined. This view control can also be defined in other manners in addition to using controlling button.

Figure 3C:

As shown in FIG. 3C, the canvas element 503 and the block element 504 are zoomed in in the stream player wrapper 502 by the CSS when the controlling button "Zoom in" is pressed. A zooming scale can be pre-defined. This view control can also be defined in other controlling manners in addition to using controlling button.

Figure 3D:

As shown in FIG. 3D, the canvas element 503 and the block element 504 are moved in the stream player wrapper 502 by the CSS when the controlling button named as "Translate" is pressed. A translation direction and a translation distance can be pre-defined. This view control can also be defined in other controlling manners, like using touch panning.

Figure 4A:
FIGS. 4A-4C are diagrams illustrating embodiments of the video, the attached information, and the video stacked with the attached information according to the present disclosure.
Figure 4B:
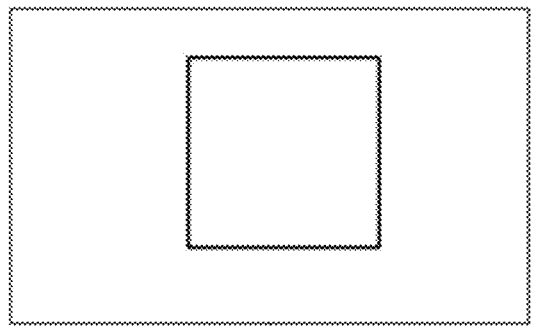
Figure 4C:

FIGS. 4A-4C show the video, the attached information, and how the video and the attached information are being stacked. The method can be used in sampling and defect labeling of manufactured integrated circuit (IC) chips.

FIG. 4A shows the video. The video is the streaming image of the IC chip taken by the external camera system 200.

FIG. 4B shows the attached information. The attached information is the size and information of the bounding box of the IC chip.

FIG. 4C shows the video and the attached information being stacked by the CSS. The video taken by the external camera system 200 and the attached information are directly shown to the users. Thus, images in the video of the IC chip can be cropped, and sampling or a defect labeling can be performed.

When the video is blurry, a lens of the external camera system 200 needs to be checked for focusing on the IC chip. The method assists the user for adjusting the lens in the external camera system 200.

Referring to FIG. 5, FIG. 5 shows the apparatus 100 for displaying web video.

In one embodiment, the apparatus 100 for displaying the web video can include function modules composed by program codes. The program codes in the apparatus 100 can be stored in a storage medium, and be implemented by a processor for executing functions of displaying the web video.

In one embodiment, the apparatus 100 is divided into different modules based on different functionalities. The modules can include an image processing module 10, an information processing module 40, a style cascading module 102, and a displaying visualization module 103.

In one embodiment, "module" as referred to in the present disclosure refers to a series of computer-readable instruction segments that can be executed by at least one processor and that are capable of performing fixed functions, which are stored in a memory. In some embodiment, the functions of each module will be detailed in the following embodiments.

The image processing module 10 is configured to obtain information of an image, create a canvas element according to the information of the image, and draw canvas based on the information of the image. The information of the image includes a pixel information of the image and a size of the image.

The image processing module 10 is also configured to convert ArrayBuffer objects into Uint8ClampedArray objects based on the pixel information of the image and convert Uint8ClampedArray objects into ImageData objects based on the size of the image.

In one embodiment, the image is a frame of the video filmed by an external camera system 200. The size of the image includes the width and height of the image. The external camera system 200 is configured to film recognizing objects, which are required to be sampled or submitted for defect labeling.

In one embodiment, the external camera system 200 can be one or more cameras, and can also be one or more video capturing devices.

In one embodiment, the image processing module 10 obtains the size of the image through an application programming interface (API) of the external camera system 200. The API can be several pre-defined functions to provide an application or developers with an access to independent services running on external software or hardware, without accessing source codes. For example, the size of the image is obtained from the external camera system 200 through the API.

In one embodiment, the external camera system 200 transmits the pixel information to the electronic device 400 through a WebSocket. WebSocket is a protocol in a full duplex communication over a single transmission control protocol (TCP). WebSocket allows a server to proactively push data to clients. A persistent connection between the server and the clients can be established, which allows two-way data transmission. The pixel information of the image is a set of RGB values and a transparency value of each pixel in the image, a format of which is an ArrayBuffer object. The ArrayBuffer object is a representation for continuous binary data, storing an array of bytes. Directly reading and writing the contents of the ArrayBuffer object are not allowed, but this can be achieved using a TypeArray object or a DataView object. The TypeArray object is an array of typed data, which provides an array-like view of the underlaying binary data buffer for reading or writing data in the TypeArray object. The DataView object is a low-level interface for reading or writing values in multiple data types in the ArrayBuffer object.

In one embodiment, the electronic device 400 using the method can include one or more controlling buttons (not shown) with specified names can be defined, and also can include one or more monitoring units (not shown). The specified names can be defined by different functions. The controlling buttons control states of the electronic device 400. The monitoring unit monitors the states of the electronic device 400.

Preferably, a WebSocket connection between the image processing module 10 and the external camera system 200 is established, when a play button of the controlling buttons in the present disclosure is pressed.

Preferably, the WebSocket connection between the image processing module 10 and the external camera system 200 is established, when the monitoring unit detects that an auto-play function is turned on.

Preferably, the image processing module 10 pauses the process of image drawing, and the WebSocket connection between the image processing module 10 and the external camera system 200 is closed, when the monitoring unit detects a web page is changed.

Preferably, the image processing module 10 pauses the process of image drawing, and the WebSocket connection between the image processing module 10 and the external camera system 200, when the monitoring unit detects no image can be displayed.

In one embodiment, the Uint8ClampedArray object is a type of TypedArray object, which defines a one dimensional array and stores data in a 8-bit integer format. The image processing module 10 converts the ArrayBuffer object into the Uint8ClampedArray object, so reading or writing operations can be executed.

In one embodiment, the ImageData object is used to draw images on the web page canvas. The ImageData includes three parameters: array, width, and height. In one embodiment, image pixel data of the array, the width, and the height are used for the drawing context, width, and height of the canvas on the web page.

When the image processing module 10 converts the Uint8ClampedArray object into the ImageData object, the Uint8ClampedArray object is taken as the array parameter, and the width and height parameter values are included in the information received in the image processing module 10.

In one embodiment, the canvas element is a HyperText Markup Language (HTML) canvas element. The canvas element is used to read pixel data of the image in the ImageData object and draw into the displaying canvas. For example, if the ImageData object includes a pixel data of a red rectangle with a width of 100 pixels and a height of 100 pixels, the canvas element can draw a red rectangle with a pixel size at width of 100 and height of 100 on the displaying canvas.

The information processing module 40 is configured to extract an attached recognition information, create a block element based on the attached recognition information, and set the attached recognition information into the block element.

The information processing module 40 also is configured to extract the attached recognition information, and convert a part of the extracted attached recognition information selected into a displayable information.

In one embodiment, the information processing module 40 sends a connection request with recognition parameters to the external recognition system 300. The connection request is a HyperText Transfer Protocol Request (HTTP Request) for establishing a network connection between the information processing module 40 and an external recognition system 300 (as shown in FIG. 5). The external recognition system 300 processes the image obtained by the external camera system 200 to output an attached recognition information. The attached recognition information includes information related to a size and coordinates of the bounding box of recognizing object. The recognition parameters are used for informing the external recognition system 300 about the type and a size of the recognizing object.

In one embodiment, the external recognition system 300 sends the attached recognition information of the image using a Server-Sent Events (SSE). SSE enables the external recognition system 300 to push data, and maintains the connection to the electronic device 400. The external recognition system 300 can keep sending the latest data. The attached recognition information includes the size and the coordinates of the bounding box of the recognizing object.

The information processing module 40 receives the attached recognition information through SSE. The attached information is in a JavaScript Object Notation (JSON) format. The JSON format is a data storing format, which is language-agnostic and lightweight. Using the JSON format for transmitting the attached information, a resource utilization of the server and the client can be reduced, and an amount of data stored in the server and the client can be decreased.

In one embodiment, the electronic device 400 using the method can include one or more controlling buttons with specified names, and one or more monitoring units. The specified names can be defined by different functions. The controlling buttons are control states of the electronic device 400. The monitoring units are configured to monitor the states of the electronic device 400.

Preferably, the SSE connection between the information processing module 40 and external camera system 200 is established, when the play button of the controlling buttons in the present disclosure is pressed.

Preferably, the SSE connection between the information processing module 40 and the external camera system 200 is established, when the monitoring unit detects that an auto-play function is turned on.

Preferably, the SSE connection between the information processing module 40 and the external camera system 200 is paused, when the monitoring unit detects the web page is changed.

Preferably, the SSE connection between information processing module 40 and the external camera system 200 is paused, when the monitoring unit detects no image can be displayed.

In one embodiment, the attached information in JSON format obtained by the information processing module 40 is converted into an inline JSON object for extracting the data in the attached recognition information, which is then used on the web page.

In one embodiment, a JSON parser is used for extracting the attached recognition information in JSON format. Such function is also be called for extracting the attached recognition information in JSON format.

In one embodiment, the information processing module 40 selects a part of the extracted attached recognition information to convert into the displayable information. Such part can include the size and the coordinates of the bounding box of the recognizing object. The displayable information is used to aid the visualizations on the web page.

In one embodiment, the electronic device 400 using the method can include one or more controlling buttons with specified names. The specified names can be defined by different functions. The controlling buttons can be configured to control whether the extracted attached recognition information is converted to displayable information and be displayed on the web page.

Preferably, the information processing module 40 selects the attached information with the size and coordinates of the bounding box of the recognizing object, which is then converted into displaying information for visualization on the web page, when a "Show Size" button of the controlling buttons in the present disclosure is pressed.

Preferably, the information processing module 40 is disabled and stops converting the extracted attached recognition information into the displayable information when a "No Overlays" button of the controlling buttons in the present disclosure is pressed.

In one embodiment, the block element is a div element of the HTML, and is set as a block on the web page. The data is set into the block for visualizations.

The style cascading module 102 is configured to compose the web page and stacks the elements.

In one embodiment, Cascading Style Sheets (CSS) are used for composing and stacking the elements of the HTML web page. The layout of elements composition can include, but not limited to, displaying, hiding, rotating, zooming in, and translating the content of the stream player.

It is understood that, the CSS can compose and stack the canvas element and the block element. The CSS can define a relative position, a size, and a stacking sequence of the elements of the HTML web page.

Each element of the HTML has a z-index style property, which represents the stacking sequence of the element. The CSS stacks the element in the order according to the z-index value. The larger the value of the z-index property, the higher the element will be in the stacking sequence. For example, when the canvas element needed to be stacked at the bottom, the z-index property of the canvas element is set as 0 in the CSS, and the z-index property of other elements are set as positive integers.

In one embodiment, the electronic device 400 using the method can include one or more controlling buttons with specified names, stream player wrapper, and error information. The specified names can be defined by different controlling functions. The controlling buttons are configured to control a composing and stacking manner of the elements of the HTML using CSS. The stream player wrapper is an outline wrapper element for containing the stream player displaying the web video. The error information is a received error icon or an error information when an apparatus 100 (as shown in FIG. 5) experiences a connection error.

Preferably, the style cascading module 102 can also utilize CSS to compose and stack the controlling buttons, the stream player wrapper, and the error information.

The displaying visualization module 103 is configured to display the video and the attached information.

In one embodiment, the displaying visualization module 103 displays the elements of the HTML being composed and stacked by the style cascading module 102.

FIG. 6 shows the electronic device 400.

In one embodiment, the electronic device 400 includes a storage medium 401, at least one processor 402, at least one communication bus 403, and a communication interface 404.

A person skilled in the art may understand that the structure of the electronic device 400 shown in the FIG. 6 constitutes no limitation to the present disclosure, and may be a bus type structure or may be a star type structure, and may include more or fewer components than those shown in the figure, or some components may be combined, or a different component deployment may be used.

In some embodiment, the electronic device 400 is an electronic device operating automatically according to a pre-set or pre-stored instruction, and its hardware includes, but not limited to, a microprocessor, an application-specific integrated circuit (ASIC), a programmable gate array (FPGA), a digital processor (DSP), or an embedded device, etc. The electronic device 400 also includes a client device. The client device can include, but not limited to, any kind of electronic product that may perform human-machine interaction with a user through a keyboard, a mouse, a remote controller, a touch pad, or a handwriting device, and the like, for example a personal computer, a tablet, a mobile phone, and a digital camera, and the like.

Those skilled in the art should understand that the above electronic device 400 is only exemplary, and other existing or future possibly electronic product, if applicable to the present invention, should also be included within the protection scope of the present invention, and are incorporated here by reference.

In some embodiments, the storage medium 401 is configured to store program codes and various data, such as the apparatus 100 for displaying the web video installed in the electronic device 400. The storage medium 401 realizes high speed and automatic access of the program or data during operations on the electronic device 400. The storage medium 401 can include a read-only memory (ROM), a programmable read-only memory (PROM), a erasable programmable read-only memory (EPROM), a on-time programmable read-only memory (OTPROM), a electrically-erasable programmable read-only memory (EEPROM), a compact disc read-only memory (CD-ROM), an optical storage medium, a disk storage medium, a magnetic tape memory, or other mediums capable of carrying or storing computer readable data.

In some embodiments, the at least one processor 402 can be an integrated circuit, such as a single packaged integrated circuit, or may include a plurality of packaged integrated circuits having the same function or different functions. For example, the at least one processor 402 may include one or more central processing units (CPUs), microprocessors, digital signal processors (DSPs), graphic processing units (GPUs), or a combination thereof. The at least one processor 402 is a control unit of the electronic device 400, connects all parts of the electronic device 400 by using all types of interfaces and circuits, and executes functions of the electronic device 400 and processes data by running or executing the software program and/or modules stored in the storage medium 401 and calling data stored in the storage medium 401.

In some embodiments, the at least one communication bus 403 enables communication between the storage medium 401 and the at least one processor 402.

In some embodiments, the communication interface 404 uses any apparatus like a transceiver, and is configured to communicate with another device or a communications network, such as an Ethernet, a radio access network (RAN), or a wireless local area network (WLAN), and the like.

The electronic device 400 may further include the power supply (for example, a battery) for supplying power for all the components. Preferably, the power supply may be logically connected to the at least one processor 402 using a power supply management system such that functions such as charging and discharging management and power consumption management are implemented using the power supply management system. The power supply also can include one or more of a DC or AC power source, a recharging device, a power failure detection circuit, a power converter or inverter, a power status indicator, and the like. The computer device 400 may further include various devices, such as a WI-FI module, sensors, and the like.

It should be noted that the above embodiments are only for explaining the technical solutions of the present disclosure, and the above embodiments are not intended to be limiting.

The above described integrated units implemented in a form of software function modules can be stored in a computer readable storage medium. The software function modules as described above are stored in a storage medium, and the software function modules include instructions for instructing a computer device (e.g., the computer device can be a personal computer, a server, or a network device, etc.) or a processor to perform some or all steps of methods in various embodiments of the present disclosure.

In a further embodiment, as shown in FIG. 5, the at least one processor 402 can execute various types of applications (such as the apparatus 100 for displaying the web video) installed in the electronic device 400, program codes, and the like. For example, the at least one processor 402 can execute all of the above modules.

The storage medium 401 stores program codes, and the at least one processor 402 can invoke the program codes stored in the storage medium 401 to perform functions. For example, the modules in FIG. 5 are program codes stored in the storage medium 401, and executed by the at least one processor 402 to implement the functions of the various modules for the purpose of processing and displaying the web video.

In one embodiment, the storage medium 401 stores one or more instructions. The instructions can be executed by the at least one processor 402 to achieve the required purposes.

In detail, the at least one processor 402 implements an embodiment of a method of the instruction. Reference can be made to the description of relevant steps in the corresponding embodiments of FIG. 1. The descriptions are not repeated herein.

In some embodiments provided by the present disclosure, it should be understood that a disclosed an apparatus, a device, and a method can be implemented in other manners. For example, apparatus embodiments described above are illustrative. For example, a division of the modules is only a logical function division, and an actual implementation can be in another division manner.

Further, the computer readable storage medium can be non-transitory, also can be transitory.

Further, the computer readable storage medium mainly include a program storage area and a data storage area, where the program storage area may store an operating system, at least one application program required by a function, and the like; and the data storage area may store data which is created according to usage, of a blockchain node, and the like.

The units described as separate parts may or may not be physically separate, and parts displayed as units may or may not be physical units, may be located in one position, or may be distributed on a plurality of network units. A part or all of the units may be selected according to actual needs to achieve the embodiments of the present disclosure.

Functions of the units in the embodiments of the present disclosure may be integrated into one processing unit, or each of the units may be an independent physical module, or two or more units can be integrated into one unit. An integrated unit above can be implemented in the form of hardware or in a form of hardware with software function modules.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing an image process of web videos used in an electronic device, the electronic device comprises a non-transitory storage medium with program codes, which implements the method when executed by a processor, the method comprises:
   obtaining information of an image in a web video;
   creating a canvas element based on the information of the image and drawing a canvas context based on the information of the image;
   obtaining attached recognition information of the image, extracting the attached information, selecting and converting a part of the extracted attached recognition information into displayable information, creating a block element based on the displayable information, and setting the displayable information into the block element; the part of the extracted attached recognition information is a size and coordinates of a bounding box of a filmed object in the image required to be sampled for defect labeling;
   composing a web page and stacking the block element on the web page; and
   displaying the web video and the displayable information on the web page.

2. The method of claim 1, wherein the information of the image comprises a pixel information of the image and a size of the image.

3. The method of claim 2, wherein the method further comprises:
   converting the information of the image in a first object into a second object.

4. The method of claim 3, wherein the method further comprises:
   converting the information of the image in the second object into a third object.

5. The method of claim 4, wherein:
   the first object is an ArrayBuffer object;
   the second object is an Uint8ClampedArray object; and
   the third object is an ImageData object.

6. An electronic device comprises:
   a storage; and
   a processor,
   wherein the storage stores computer programs, and
   the processor executes the computer programs to implement the following:
      obtaining information of an image in a web video, creating a canvas element based on the information of the image, and drawing a canvas context based on the information of the image;
      obtaining attached recognition information of the image, extracting the attached information, selecting and converting a part of the extracted attached recognition information into displayable information, creating a block element based on the displayable information, and setting the displayable information into the block element; the part of the extracted attached recognition information is a size and coordinates of a bounding box of a filmed object in the image required to be sampled for defect labeling;
      composing a web page and stacking the block element on the web page; and
      displaying the web video and the displayable information on the web page.

7. The electronic device of claim 6, wherein the information of the image comprises a pixel information of the image and a size of the image.

8. The electronic device of claim 7, wherein the image processing module converts the information of the image in a first object into a second object.

9. The electronic device of claim 8, wherein the image processing module converts the information of the image in the second object into a third object.

10. The electronic device of claim 9, wherein:
    the first object is an ArrayBuffer object;
    the second object is an Uint8ClampedArray object; and
    the third object is an ImageData object.

11. A non-transitory computer readable storage medium, the non-transitory computer readable storage medium stores computer programs, and the computer programs are executed by at least one processor to implement the following steps:
    obtaining information of an image in a web video, creating a canvas element based on the information of the image, and drawing a canvas context based on the information of the image;
    obtaining attached recognition information of the image, extracting the attached information, selecting and converting a part of the extracted attached recognition information into displayable information, creating a block element based on the displayable information, and setting the displayable information into the block element; the part of the extracted attached recognition information is a size and coordinates of a bounding box of a filmed object in the image required to be sampled for defect labeling;
    composing a web page and stacking the block element on the web page; and displaying the web video and the displayable information on the web page.

12. The non-transitory computer readable storage medium of claim 11, wherein the information of the image comprises a pixel information of the image and a size of the image.

13. The non-transitory computer readable storage medium of claim 12, wherein the steps implemented by the processor further comprises:
    converting the information of the image in a first object into a second object.

14. The non-transitory computer readable storage medium of claim 13, wherein the steps implemented by the processor further comprises:
    converting the information of the image in the second object into a third object.

15. The non-transitory computer readable storage medium of claim 14, wherein:
    the first object is an ArrayBuffer object;
    the second object is an Uint8ClampedArray object; and
    the third object is a ImageData object.

* * * * *